US012374830B2

(12) United States Patent
Yi et al.

(10) Patent No.: US 12,374,830 B2

(45) Date of Patent: Jul. 29, 2025

(54) PLUG CONNECTOR WITH IMPROVED INSERTION RELIABILITY

(71) Applicant: DONGGUAN LUXSHARE TECHNOLOGIES CO., LTD, Dongguan (CN)

(72) Inventors: Sihai Yi, Dongguan (CN); Zhaolong Zeng, Dongguan (CN); Tiesheng Li, Dongguan (CN); Qiongnan Chen, Dongguan (CN)

(73) Assignee: DONGGUAN LUXSHARE TECHNOLOGIES CO., LTD, Dongguan (CN)

( * ) Notice: Subject to any disclaimer, the term of this patent is extended or adjusted under 35 U.S.C. 154(b) by 367 days.

(21) Appl. No.: 17/883,843

(22) Filed: Aug. 9, 2022

(65) Prior Publication Data

US 2023/0163527 A1 May 25, 2023

(30) Foreign Application Priority Data

Nov. 22, 2021 (CN) ......................... 202122892800.7

(51) Int. Cl.

*H01R 13/635* (2006.01)

*H01R 12/53* (2011.01)

(Continued)

(52) U.S. Cl.

CPC ........... *H01R 13/635* (2013.01); *H01R 12/53* (2013.01); *H01R 13/512* (2013.01);

(Continued)

(58) Field of Classification Search

CPC .. H01R 23/7005; H01R 12/53; H01R 13/631; H01R 13/629; H01R 13/635;

(Continued)

(56) References Cited

U.S. PATENT DOCUMENTS

| | | | | |
|---|---|---|---|---|
| 8,182,296 B2 * | 5/2012 | De Blieck | H01R 43/02 | 439/378 |
| 2012/0214345 A1 * | 8/2012 | Wu | H01R 13/6583 | 439/607.19 |

(Continued)

FOREIGN PATENT DOCUMENTS

| | | | |
|---|---|---|---|
| WO | WO-2006091255 A1 * | 8/2006 | H01R 12/7005 |
| WO | WO-2019023094 A1 * | 1/2019 | H01B 11/002 |

*Primary Examiner* — Gary F Paumen

(74) *Attorney, Agent, or Firm* — Birch, Stewart, Kolasch & Birch, LLP

(57) ABSTRACT

A plug connector includes a housing, a built-in circuit board partially located in the housing, and a cable electrically connected to the built-in circuit board. The housing includes a mating surface. The built-in circuit board includes a tongue plate and a number of conductive pads provided on the tongue plate. The housing includes an extension plate extending along a mating direction of the plug connector. The tongue plate and the extension plate protrude beyond the mating surface along the mating direction. The extension plate further protrudes beyond the tongue plate along the mating direction. Two lateral sides of the plug connector also respectively include slots extending through the mating surface. As a result, the insertion reliability of the plug connector of the present disclosure is improved.

17 Claims, 16 Drawing Sheets

(51) Int. Cl.

| | |
|---|---|
| ***H01R 13/512*** | (2006.01) |
| ***H01R 13/627*** | (2006.01) |
| ***H01R 13/633*** | (2006.01) |
| ***H01R 13/66*** | (2006.01) |

(52) U.S. Cl.
CPC ..... *H01R 13/6273* (2013.01); *H01R 13/6335* (2013.01); *H01R 13/665* (2013.01)

(58) Field of Classification Search
CPC .............. H01R 13/512; H01R 13/6273; H01R 13/6335; H01R 13/665
USPC ............................ 439/374, 377, 378, 620.21
See application file for complete search history.

(56) References Cited

U.S. PATENT DOCUMENTS

2017/0294739 A1* 10/2017 Pao .................... H01R 13/6658
2019/0058287 A1 2/2019 Li et al.

* cited by examiner

PLUG CONNECTOR WITH IMPROVED INSERTION RELIABILITY

CROSS-REFERENCE TO RELATED APPLICATION

This patent application claims priority of a Chinese Patent Application No. 202122892800.7, filed on Nov. 22, 2021 and titled "PLUG CONNECTOR", the entire content of which is incorporated herein by reference.

TECHNICAL FIELD

The present disclosure relates to a plug connector, which belongs to a technical field of connectors.

BACKGROUND

A plug connector in the related art includes a housing, a tongue plate, and a cable. A plurality of conductive pads are provided on at least one surface of the tongue plate. The plug connector includes a mating surface. The tongue plate generally protrudes beyond the mating surface.

In order to improve the mating stability of the plug connector when the plug connector is inserted into a mating receptacle connector, the plug connector further includes an extension plate protruding beyond the mating surface. The extension plate and the tongue plate are parallel to each other.

However, in the process of mating the plug connector with the receptacle connector, how to further ensure the insertion position of the plug connector so as to avoid damage to the tongue plate and the conductive pads due to insertion deviation, is a technical problem that needs to be solved by those of ordinary skill in the art.

SUMMARY

An object of the present disclosure is to provide a plug connector with high insertion reliability.

In order to achieve the above object, the present disclosure adopts the following technical solution: a plug connector, including: a housing, the housing including a mating surface; a built-in circuit board, the built-in circuit board being partially located in the housing, the built-in circuit board including a tongue plate and a plurality of conductive pads provided on the tongue plate; and a cable, the cable being electrically connected to the built-in circuit board; wherein the housing includes an extension plate extending along a mating direction of the plug connector; both the tongue plate and the extension plate protrude beyond the mating surface along the mating direction; and the extension plate further protrudes beyond the tongue plate along the mating direction; and wherein each lateral side of the plug connector defines a slot extending through the mating surface.

Compared with the prior art, the present disclosure is provided with an extension plate extending along the mating direction and protruding beyond the tongue plate. When the plug connector is inserted into the receptacle connector, the extension plate can be the first to contact the receptacle connector, which facilitates the realization of the initial positioning of the plug connector when inserted. In addition, two lateral sides of the plug connector of the present disclosure also respectively include slots extending through the mating surface, and the slots can be used to mate with positioning protrusions of the receptacle connector, which is beneficial to realize the secondary positioning of the plug connector. As a result, the insertion reliability of the plug connector is improved.

DETAILED DESCRIPTION

Figure 1:
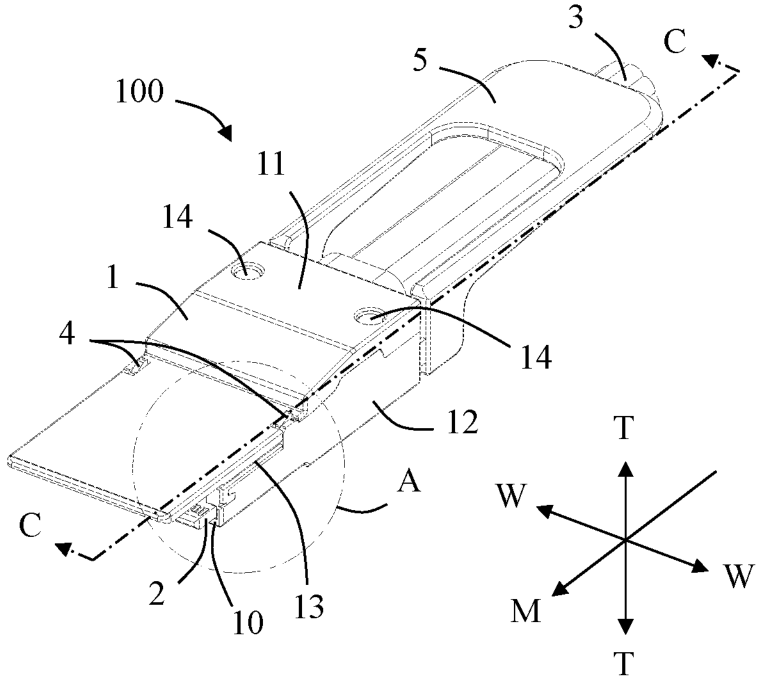
FIG. 1 is a perspective schematic view of a plug connector in accordance with an embodiment of the present disclosure.
Figure 2:
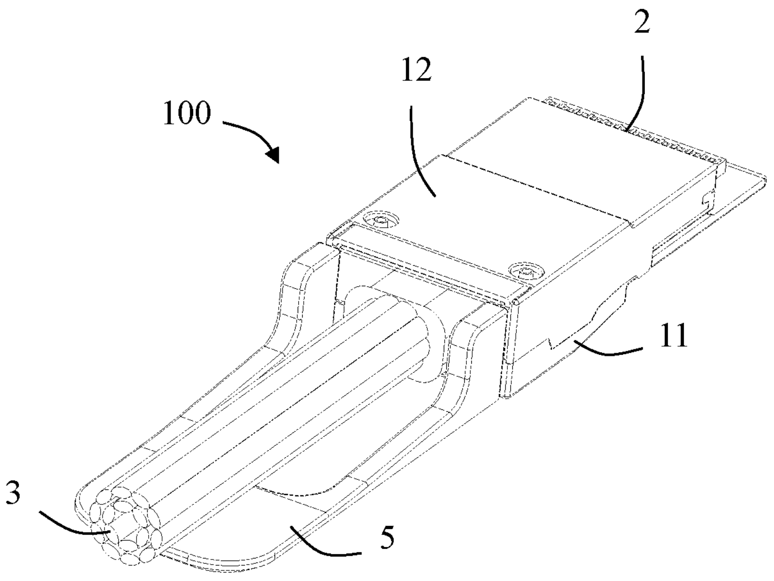
FIG. 2 is a perspective schematic view of FIG. 1 from another angle.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms "a", "said", and "the" used in this application and the appended claims are also intended to include plural forms unless the context clearly indicates other meanings.

It should be understood that the terms "first", "second" and similar words used in the specification and claims of this application do not represent any order, quantity or importance, but are only used to distinguish different components. Similarly, "an" or "a" and other similar words do not mean a quantity limit, but mean that there is at least one; "multiple" or "a plurality of" means two or more than two. Unless otherwise noted, "front", "rear", "lower" and/or "upper" and similar words are for ease of description only and are not limited to one location or one spatial orientation. Similar words such as "include" or "comprise" mean that elements or objects appear before "include" or "comprise" cover elements or objects listed after "include" or "comprise" and their equivalents, and do not exclude other elements or objects. The term "a plurality of" mentioned in the present disclosure includes two or more.

Hereinafter, some embodiments of the present disclosure will be described in detail with reference to the accompanying drawings. In the case of no conflict, the following embodiments and features in the embodiments can be combined with each other.

Referring to FIGS. 1 to 10, the present disclosure discloses a plug connector 100 including a housing 1, a built-in circuit board 2 partly located in the housing 1, a cable 3 electrically connected to the built-in circuit board 2, a locking mechanism 4 installed in the housing 1, and a pull strap 5 connected with the locking mechanism 4. In an embodiment of the present disclosure, the plug connector 100 is a high-speed interconnect plug connector, including but not limited to, a plug connector based on SFP (Small Form Factor Pluggable), QSFP (Quad Small Form Factor Pluggable), OSFP (Octal Small Form Factor Pluggable), QSFP-DD (Quad Small Form Factor Pluggable-Double Density), SFP-DD (Small Form Factor Pluggable-Double Density) or DSFP (Dual Chanel Small Form-factor Pluggable). The plug connector 100 is used to mate with a receptacle connector (not shown) along a mating direction M so as to realize high-speed data transmission. Correspondingly, the receptacle connector is a receptacle connector based on SFP (Small Form Factor Pluggable), QSFP (Quad Small Form Factor Pluggable), OSFP (Octal Small Form Factor Pluggable), QSFP-DD (Quad Small Form Factor Pluggable-Double Density), SFP-DD (Small Form Factor Pluggable-Double Density) or DSFP (Dual Chanel Small Form-factor Pluggable).

Referring to FIGS. 1 to 6, in the illustrated embodiment of the present disclosure, the housing 1 includes a first housing 11 and a second housing 12. The housing 1 includes a mating surface 10 and two slots 13 located on opposite sides (for example, a left side and a right side) of the plug connector 100 and extending through the mating surface 10. The slots 13 can be used to mate with positioning protrusions (not shown) of the receptacle connector, which is beneficial to improve the insertion reliability of the plug connector 100.

Figure 7:
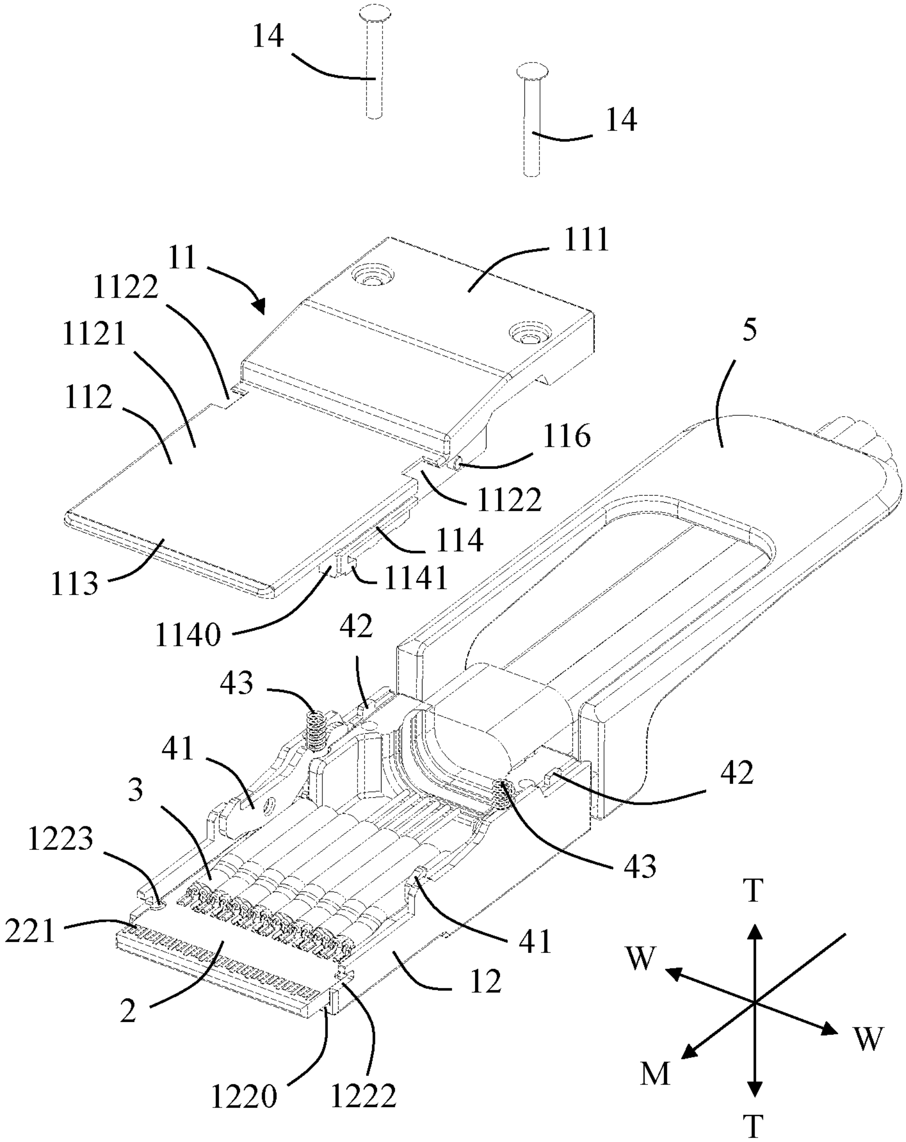
FIG. 7 is a partially exploded perspective view of FIG. 1.
Figure 8:
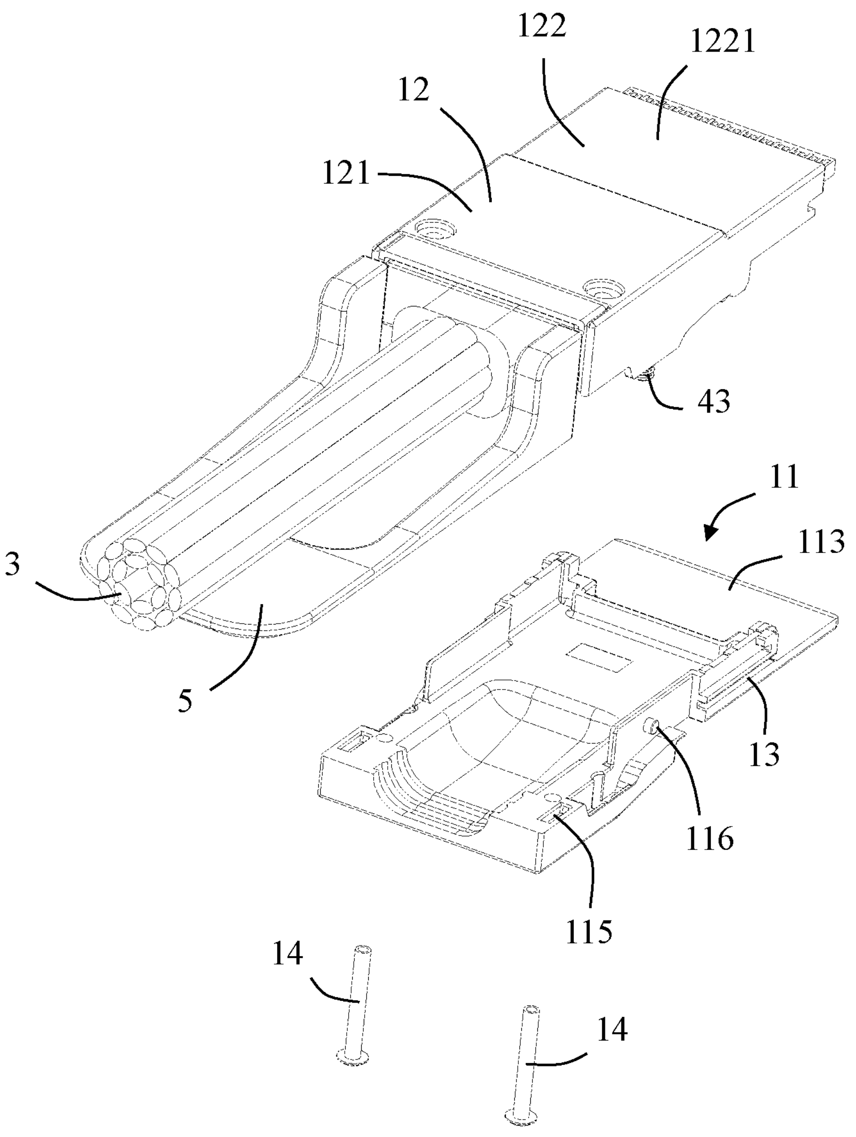
FIG. 8 is a partial perspective exploded view of FIG. 7 from another angle.

Referring to FIGS. 7 and 8, the first housing 11 includes a first base 111, a first extension portion 112 extending from the first base 111, and an extension plate 113 extending from the first extension portion 112. The first extension portion 112 includes a first surface 1121 (for example, an upper surface) and two openings 1122 extending through the first surface 1121 along a thickness direction T-T of the plug connector 100. The openings 1122 are located on opposite sides (for example, a left side and a right side) of the first extension portion 112 along a width direction W-W of the plug connector 100. Referring to FIG. 7, it is understandable to those skilled in the art that in the illustrated embodiment of the present disclosure, the mating direction M is a rear-to-front direction, the width direction W-W is a left-right direction, and the thickness direction is a vertical direction. The mating direction M, the width direction W-W and the thickness direction T-T are perpendicular to each other. In the illustrated embodiment of the present disclosure, the first extension portion 112 includes two convex portions 114 which protrude downwardly along the thickness direction T-T and are located on opposite sides (for example, a left side and a right side) of the first extension portion 112. Each convex portion 114 extends along the mating direction M. The convex portion 114 includes a first front end surface 1140 and a locking portion 1141 located at a front portion of the convex portion 114. In the illustrated embodiment of the present disclosure, the first front end surface 1140 is a vertical surface. The locking portion 1141 is of a U-shaped configuration.

The second housing 12 includes a second base 121 and a second extension portion 122 extending from the second base 121. The first base 111 corresponds to the second base 121, wherein the first base 111 is located above the second base 121 as a whole, and the first base 111 and the second base 121 are aligned in the vertical direction. The first extension portion 112 corresponds to the second extension portion 122, wherein the first extension portion 112 is located above the second extension portion 122 as a whole, and the first extension portion 112 and the second extension portion 122 are aligned in the vertical direction. The second extension portion 122 includes a second front end surface 1220. The first front end surface 1140 and the second front end surface 1220 are aligned with each other in the thickness direction T-T to jointly form the mating surface 10. The second extension portion 122 includes a second surface 1221 (for example, a lower surface). The first surface 1121 and the second surface 1221 are disposed opposite to each other along the thickness direction T-T. A front side of the second extension portion 122 includes a locking slot 1222. In the illustrated embodiment of the present disclosure, the locking slot 1222 is of a U-shaped configuration. The locking portion 1141 is fixed in the locking slot 1222 to prevent the first housing 11 and the second housing 12 from being separated from each other in the thickness direction T-T. The second extension portion 122 further includes two positioning posts 1223 on opposite sides. The positioning posts 1223 are used for positioning the built-in circuit board 2. A rear side of the second extension portion 122 is further provided with a limiting protrusion 1224 which protrudes into a corresponding opening 1122 along the thickness direction T-T.

In the illustrated embodiment of the present disclosure, the plug connector 100 further includes a bolt 14 to assemble and fix the first base 111 and the second base 121. Of course, in other embodiments, the first housing 11 and the second housing 12 may be assembled through a mutual locking structure (for example, a locking arm and a locking groove for mating with the locking arm).

Figure 9:
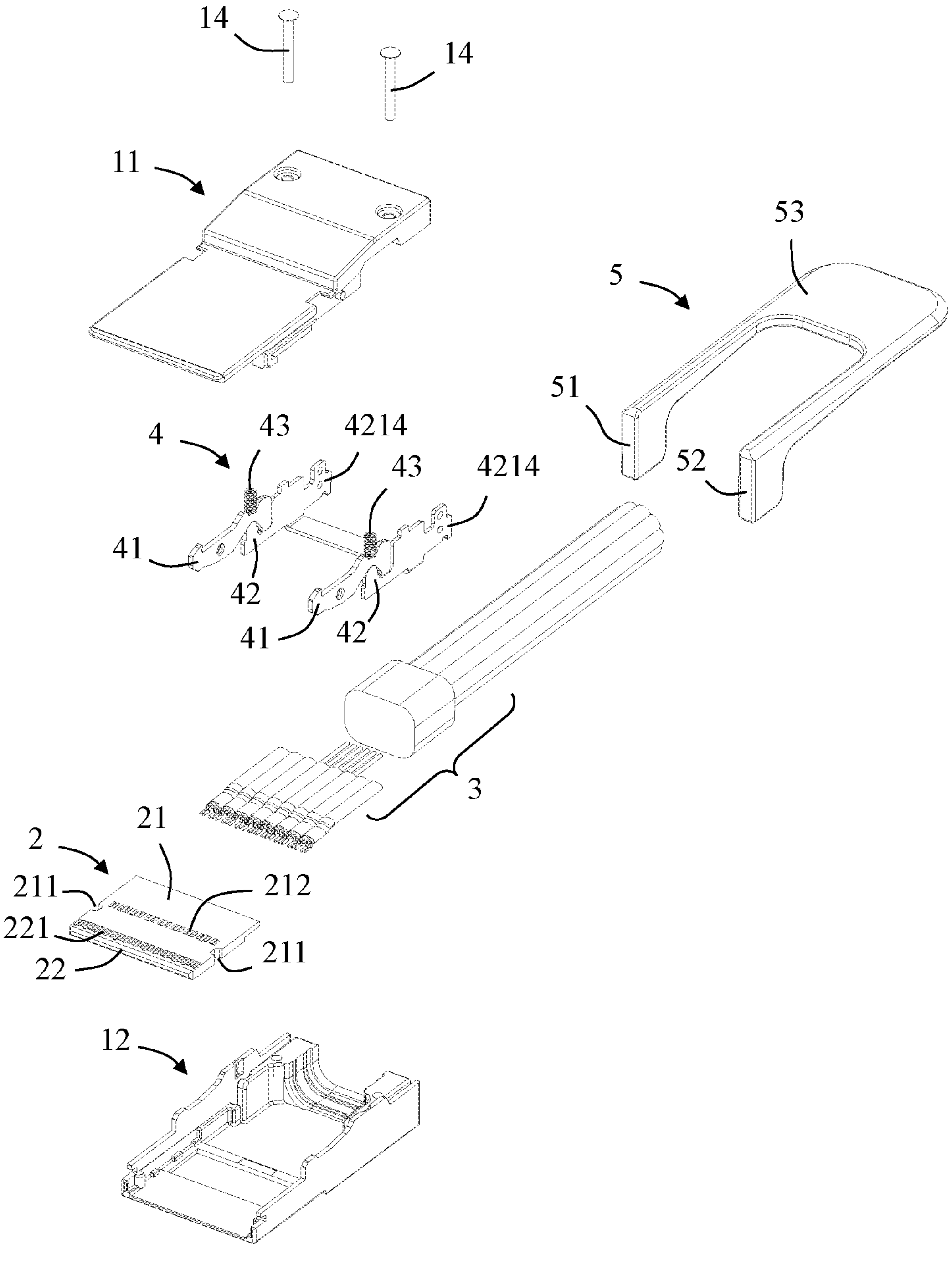
FIG. 9 is a further partial perspective exploded view of FIG. 7.
Figure 10:
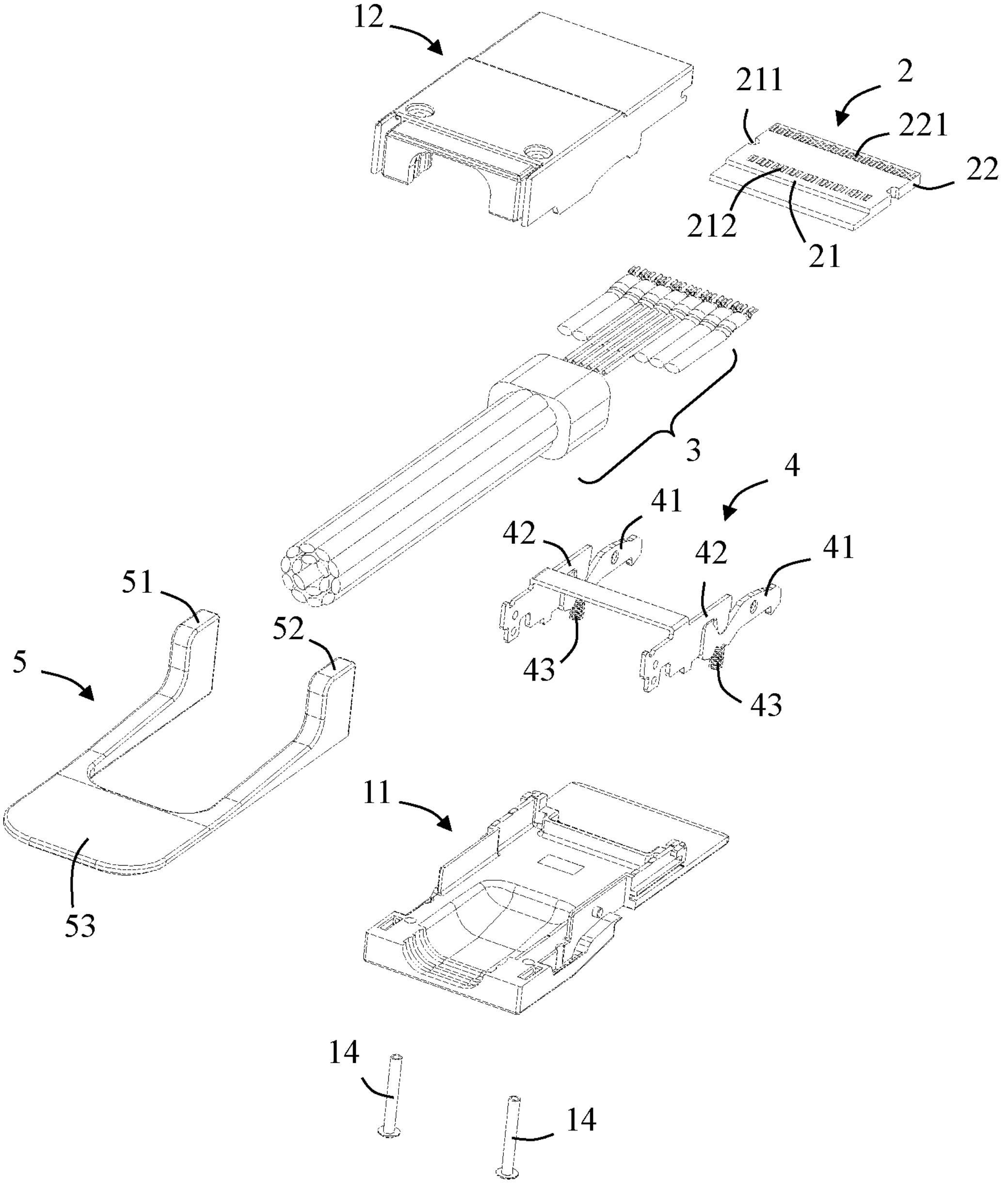
FIG. 10 is a partial perspective exploded view of FIG. 9 from another angle.
Figure 11:
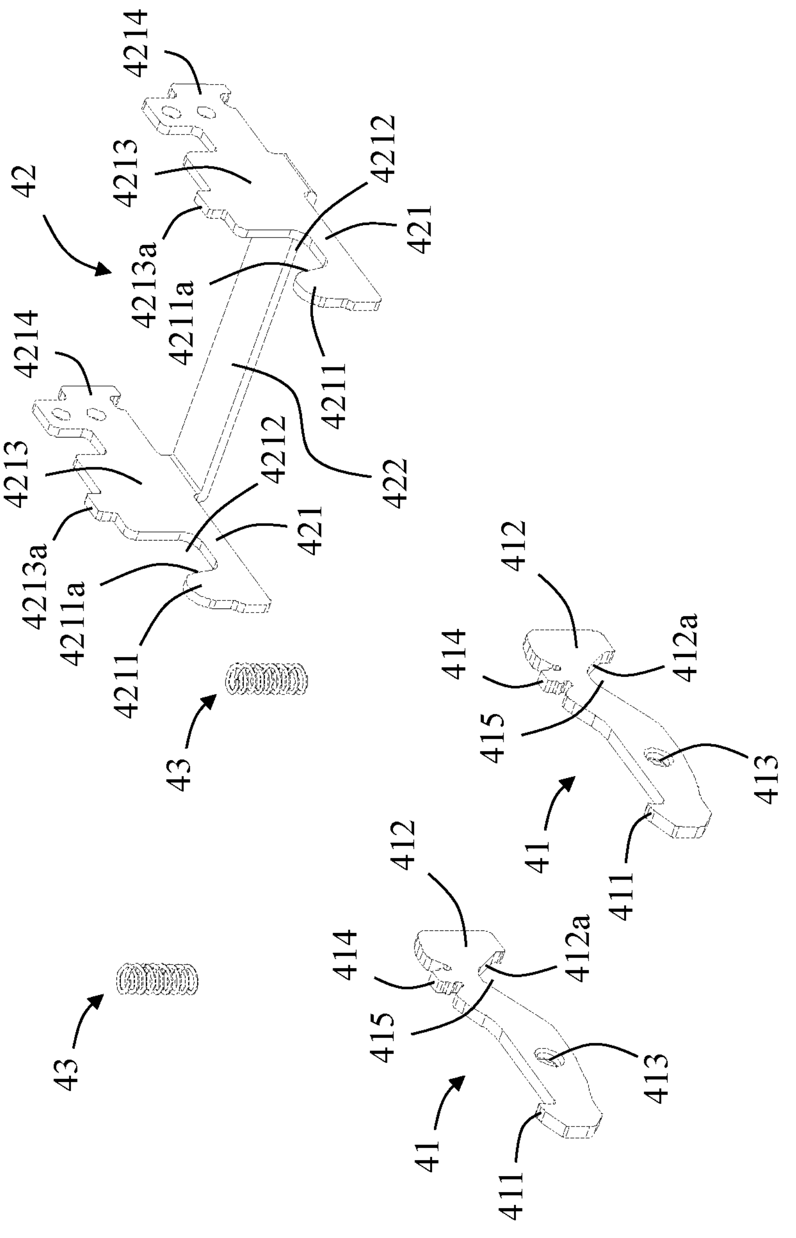
FIG. 11 is a perspective exploded view of two return springs, two locking arms and a driving member in FIG. 9.
Figure 12:
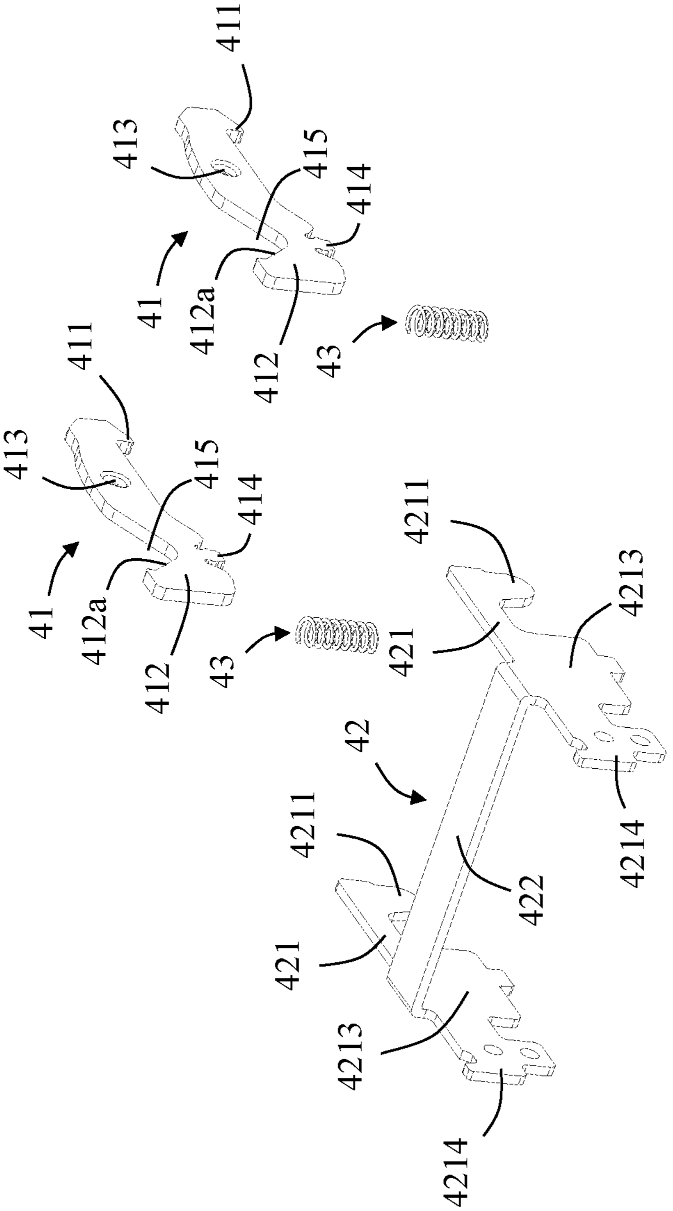
FIG. 12 is a perspective exploded view of FIG. 11 from another angle.
Figure 13:
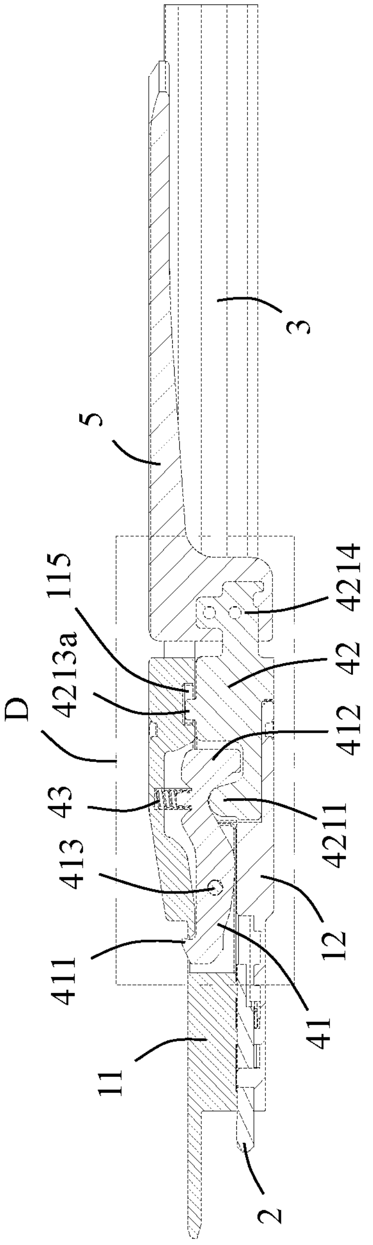
FIG. 13 is a schematic cross-sectional view taken along line C-C in FIG. 1, wherein the locking arm is located at a locked position.
Figure 14:
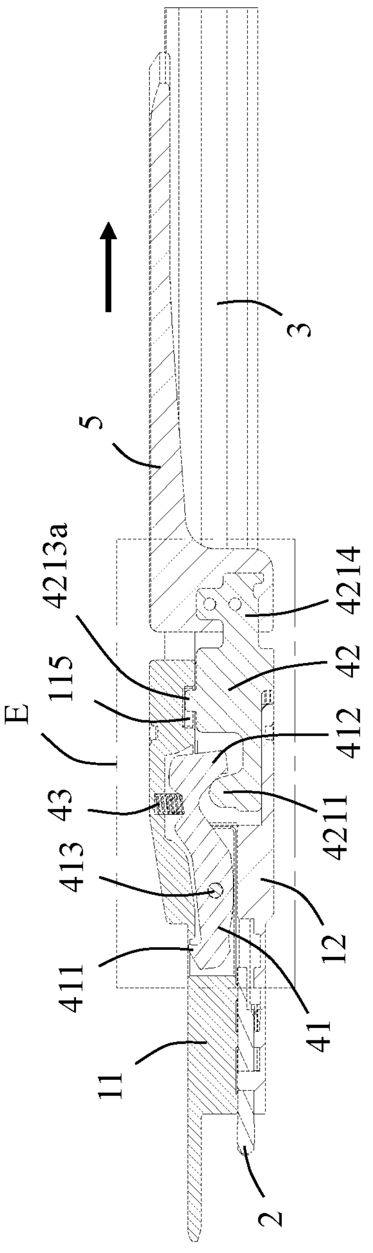
FIG. 14 is a schematic cross-sectional view of another state in FIG. 13, wherein the locking arm is located at an unlocked position.

Referring to FIGS. 7, 9 and 10, the built-in circuit board 2 includes a base plate 21 at least partially clamped between the first extension portion 112 and the second extension portion 122, and a tongue plate 22 extending forward from the base plate 21. Opposite sides of the base plate 21 include two positioning notches 211 matched with the positioning posts 1223. At least one surface of the base plate 21 is provided with a plurality of soldering pads 212 which are used for soldering and fixing with the cable 3. In the illustrated embodiment of the present disclosure, two opposite surfaces (for example, an upper surface and a lower surface) of the base plate 21 are respectively provided with the soldering pads 212, which is beneficial to maximize the use of the space of the base plate 21 as much as possible. A plurality of conductive pads 221 are provided on at least one surface of the tongue plate 22. The conductive pads 221 are used to contact the conductive terminals (not shown) of the receptacle connector so as to realize data transmission. In the illustrated embodiment of the present disclosure, the two opposite surfaces (for example, the upper surface and the lower surface) of the tongue plate 22 are respectively provided with the conductive pads 221, which is beneficial to maximize the use of the space of the tongue plate 22 as much as possible.

Figure 3:
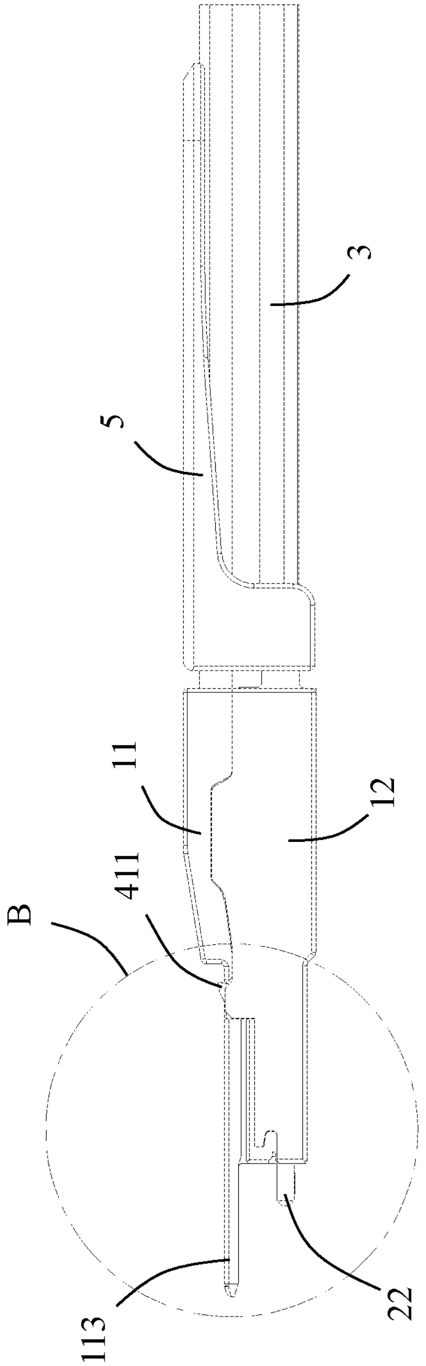
FIG. 3 is a right side view of FIG. 1.
Figure 4:
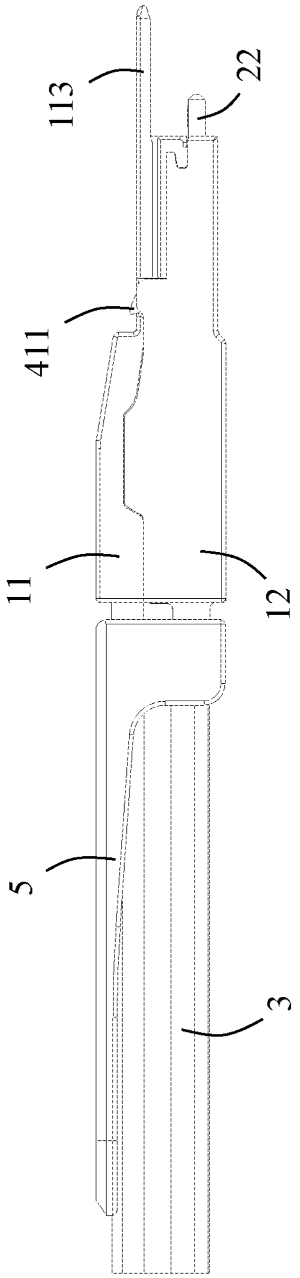
FIG. 4 is a left side view of FIG. 1.
Figure 6:
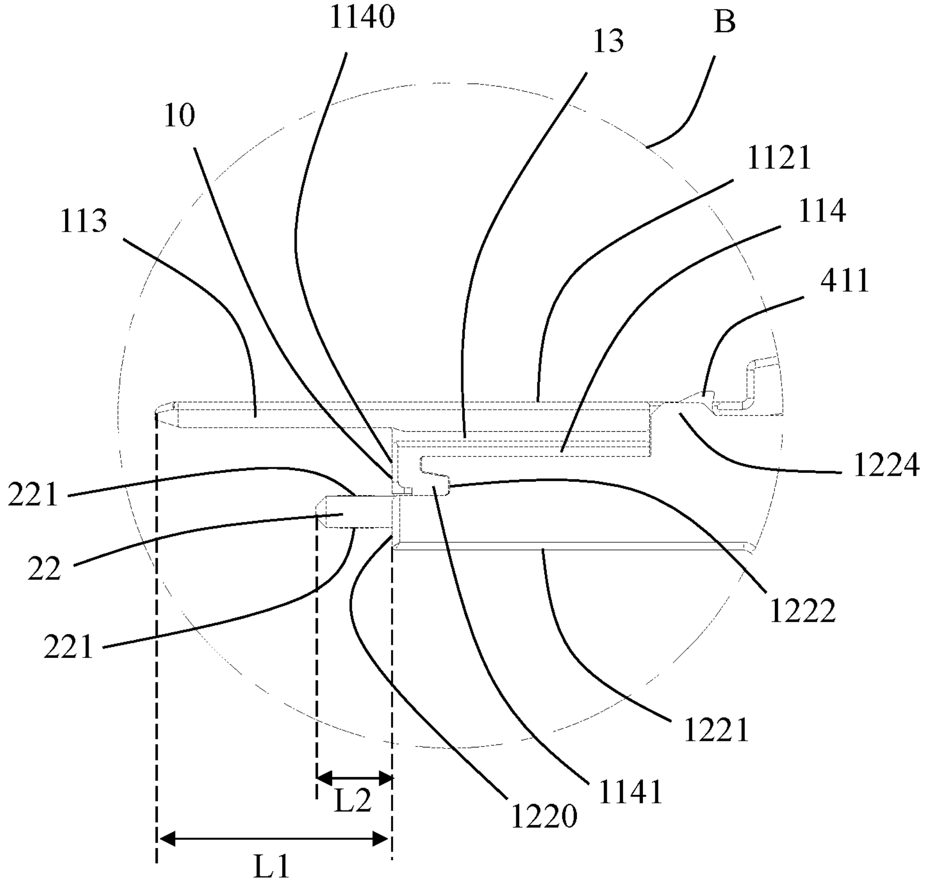
FIG. 6 is a partial enlarged view of a circled part B in FIG. 3.

As shown in FIGS. 3 and 6, both the tongue plate 22 and the extension plate 113 protrude beyond the mating surface 10 along the mating direction M. In the illustrated embodiment of the present disclosure, only one extension plate 113 is provided on a side of the tongue plate 22 along the thickness direction T-T of the plug connector 100. In other words, one side of the tongue plate 22 along the thickness direction T-T of the plug connector 100 is provided with the extension plate 113. However, on another side of the tongue plate 22 opposite to the extension plate 113, there is no feature provided protruding beyond the mating surface 10 along the mating direction M. The extension plate 113 further protrudes beyond the tongue plate 22 along the mating direction M. In the illustrated embodiment of the present disclosure, a length of the extension plate 113 protruding beyond the mating surface 10 along the mating direction M is L1, a length of the tongue plate 22 protruding beyond the mating surface along the mating direction M is L2, where L1≥2*L2. With this arrangement, by appropriately increasing the length of the extension plate 113, when the plug connector 100 is inserted into the receptacle connector, the extension plate 113 will contact the receptacle connector as early as possible to achieve pre-positioning. This is also beneficial to protect the tongue plate 22 and avoid possible damage to the tongue plate 22 due to incorrect insertion angles or mismatched receptacle connectors. In addition, this design is also beneficial to increase the insertion depth of the plug connector 100 and improve the mating reliability of the plug connector 100 with the receptacle connector when the plug connector 100 is inserted in place. In an embodiment of the present disclosure, a value range of L1 is 12.0 mm to 13.0 mm, and a value range of L2 is 3.8 mm to 3.9 mm. In an embodiment of the present disclosure, a width of the extension plate 113 along the width direction W-W of the plug connector 100 falls within a range of 20.0 mm to 21.0 mm, and a width of the tongue plate 22 along the width direction W-W of the plug connector 100 falls within a range of 18.0 mm to 19.0 mm. The width of the extension plate 113 is slightly larger than the width of the tongue plate 22, so that the tongue plate 22 can be protected by the extension plate 113 to some extent.

The slot 13 is provided on the first extension portion 112; or the slot 13 is provided on the second extension portion 122; or the slot 13 is formed between the first extension portion 112 and the second extension portion 122 in the thickness direction T-T of the plug connector 100. In the illustrated embodiment of the present disclosure, the slot 13 is provided on the convex portion 114. The slot 13 extends backwardly to communicate with the corresponding opening 1122. A distance between the slot 13 and the first surface 1121 in the thickness direction T-T is smaller than a distance between the slot 13 and the second surface 1221. In other words, the slot 13 is arranged on an upper side.

Referring to FIGS. 9 to 16, the locking mechanism 4 includes two locking arms 41 installed on two inner and opposite sides of the second housing 12, a driving member 42 mated with the locking arms 41, and two return springs 43 mated with the locking arms 41, respectively.

Each locking arm 41 includes a locking protrusion 411 located at a front end of the locking arm 41, an abutting portion 412 located at a rear end of the locking arm 41, and a pivot portion 413 located between the locking protrusion 411 and the abutting portion 412. The locking arm 41 is rotatable around the pivot portion 413. The slot 13 extends backwardly to be adjacent to the locking protrusion 411. This arrangement increases a length of each slot 13 along the mating direction M and is beneficial to increase an insertion depth of the plug connector 100, thereby improving the insertion reliability of the plug connector 100.

In the illustrated embodiment of the present disclosure, the return spring 43 is a compression spring. One end of the compression spring abuts against the top of the locking arm 41; and another end of the compression spring abuts against a lower surface of the first extension portion 112. A contact position of the locking protrusion 411 and the locking arm 41, and a contact position of the return spring 43 and the locking arm 41 are located on two sides of the pivot portion 413, respectively. With this arrangement, the locking arm 41 is equivalent to a seesaw of which a fulcrum is the pivot portion 413. When no external force is applied, under the action of the compression spring, the locking protrusion 411 is located in the corresponding opening 1122 and protrudes upwardly beyond the first surface 1121. Under this condition, the locking protrusion 411 can be matched with a corresponding locking structure of the receptacle connector, that is, this state is a locking state when the plug connector 100 is inserted into the receptacle connector.

Figure 5:
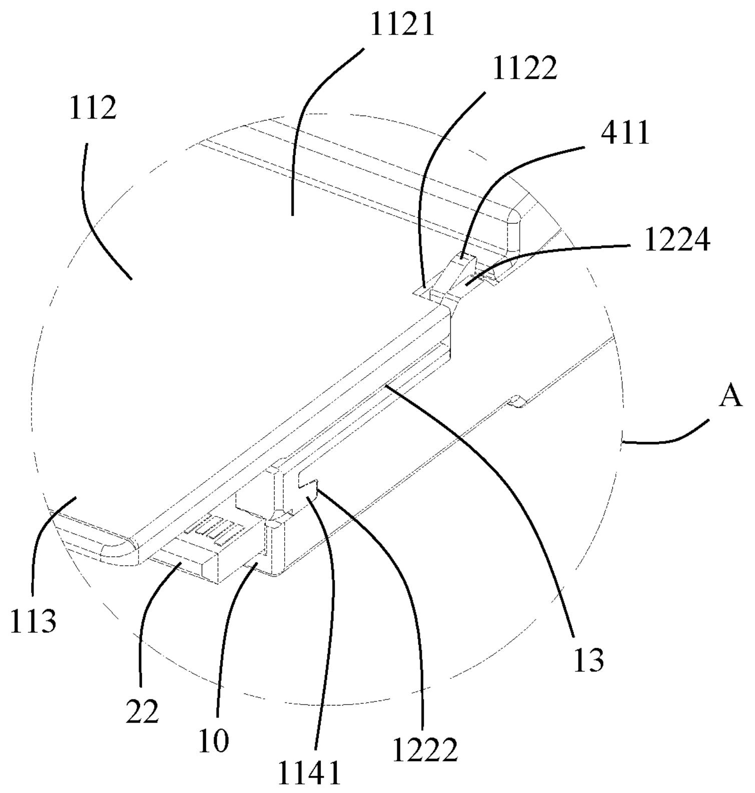
FIG. 5 is a partial enlarged view of a circled part A in FIG. 1.

As shown in FIG. 5, each limiting protrusion 1224 is located outside the corresponding locking protrusion 411 along the width direction W-W of the plug connector 100 so as to limit the locking protrusion 411.

In the illustrated embodiment of the present disclosure, in order to better fix the compression spring, each locking arm 41 further includes a mounting post 414. One end of the compression spring is sleeved on the mounting post 414 to prevent the compression spring from leaving its original position after being stressed.

In the illustrated embodiment of the present disclosure, the pivot portion 413 includes a pivot hole. The first housing 11 includes a pivot shaft 116 that matches with the pivot hole. The pivot shaft 116 is integrally formed on the first housing 11. The locking arm 41 is rotatable around the pivot shaft 116 under the action of the external force. Of course, in other embodiments, the pivot shaft 116 may also be integrally formed on the second housing 12; or the pivot shaft 116 is a separate shaft assembled to the first housing 11 and/or the second housing 12.

Of course, in other embodiments, the return spring 43 may also be a tension spring. One end of the tension spring is fixed to the locking arm 41, and the other end of the tension spring is fixed to the housing 1.

In addition, each locking arm 41 further includes a first recess 415 located between the abutting portion 412 and the pivot portion 413, and an inner abutting surface 412*a* exposed in the first recess 415. In the illustrated embodiment of the present disclosure, the first recess 415 is located below the mounting post 414 and is aligned with the mounting post 414 in the vertical direction. The inner abutting surface 412*a* is provided on the abutting portion 412. In the illustrated embodiment of the present disclosure, the inner abutting surface 412*a* is an inclined surface.

Figure 15:
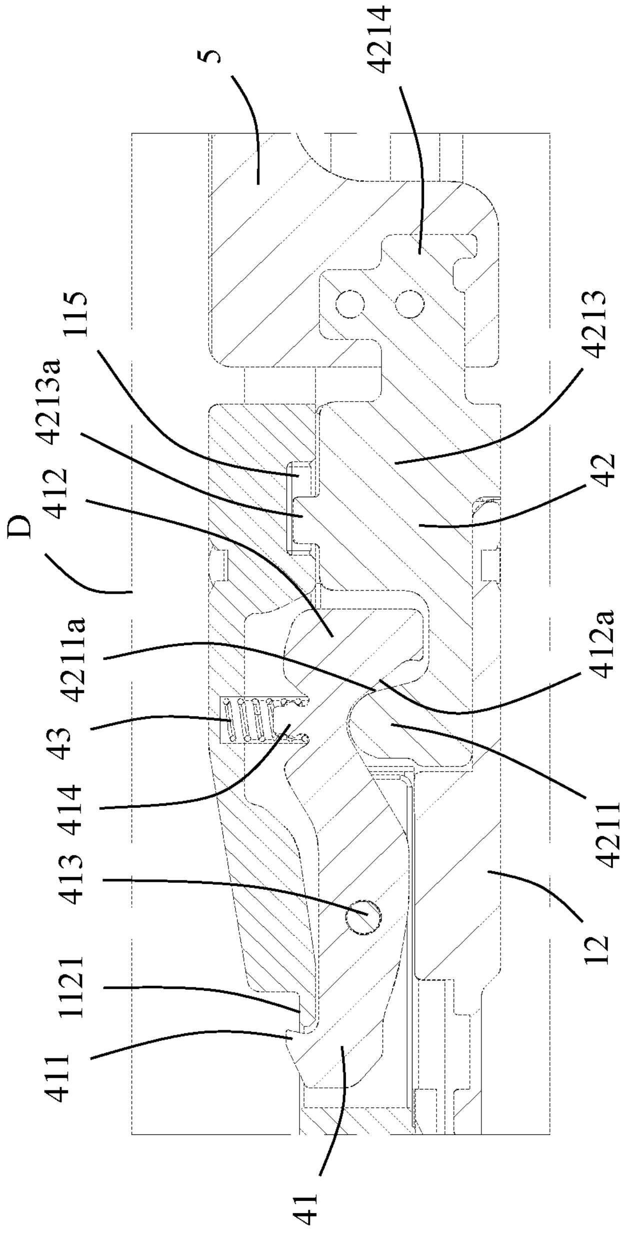
FIG. 15 is a partial enlarged view of a frame part Din FIG. 13.
Figure 16:
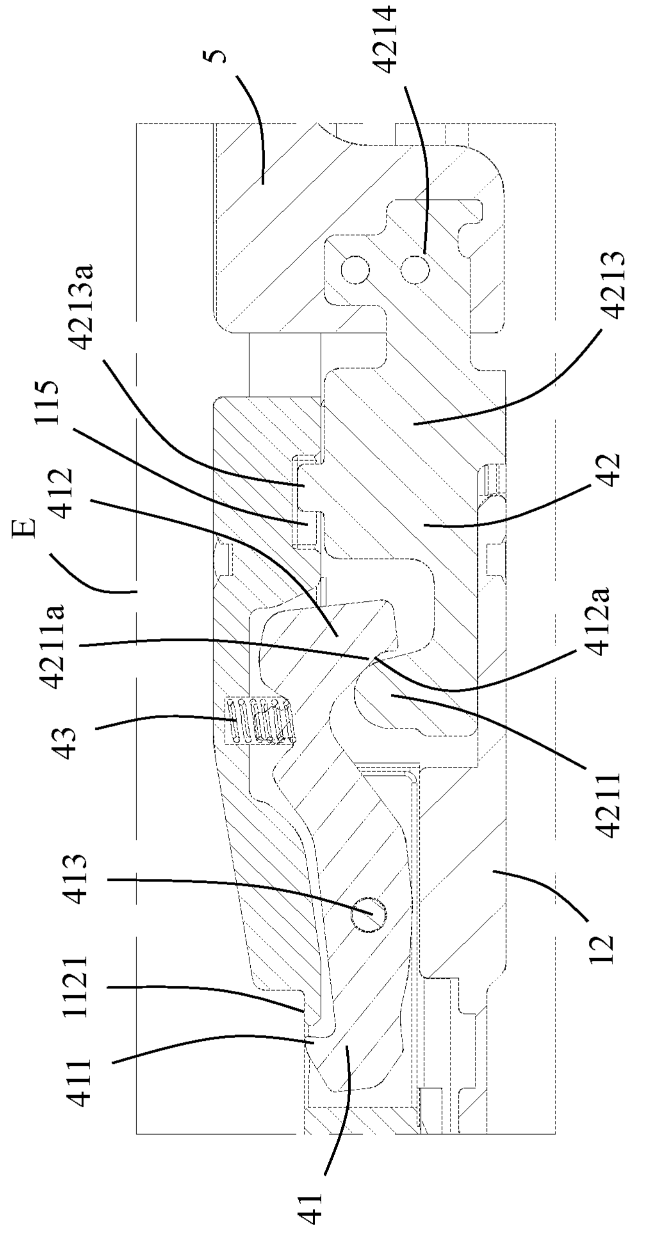
FIG. 16 is a partial enlarged view of a frame part E in FIG. 14.

The driving member 42 is connected to the pull strap 5. The driving member 42 includes two driving arms 421 located on opposite sides and a connecting rod 422 which connects the two driving arms 421. Each driving arm 421 is located at a rear end of the corresponding locking arm 41 and abuts against the locking arm 41. Each driving arm 421 includes a protruding portion 4211 received in the first recess 415, a second recess 4212 for receiving the abutting portion 412, a base portion 4213 connected to the protruding portion 4211 and a fixing portion 4214 protruding backwardly from the base portion 4213. The protruding portion 4211 includes an outer abutting surface 4211*a* which abuts against the inner abutting surface 412*a*. In the illustrated embodiment of the present disclosure, the outer abutting surface 4211*a* is a curved surface. Through the cooperation of the curved surface and the inclined surface, the smoothness of the interaction between the driving arm 421 and the locking arm 41 is improved. As shown in FIGS. 15 and 16, the base portion 4213 is provided with a protrusion 4213*a* extending upwardly. The first housing 11 includes a limiting slot 115. The protrusion 4213*a* is movable in the limiting slot 115 under the action of external force. In the illustrated embodiment of the present disclosure, the fixing portion 4214 is insert-molded in the pull strap 5. The connecting rod 422 connects the base portions 4213 of the two driving arms 421 to strengthen the structure of the driving member 42, improve the stability of the driving member 42 when moving, and improve the synchronization of the movement of the two locking arms 41.

As shown in FIG. 9, the pull strap 5 includes a first connecting portion 51 and a second connecting portion 52 which are respectively connected to the fixing portions 4214 of the two locking arms 41. The first connecting portion 51 and the second connecting portion 52 respectively extend in a vertical direction and are parallel to each other. In the illustrated embodiment of the present disclosure, the first connecting portion 51 and the second connecting portion 52 are both L-shaped. The pull strap 5 further includes a bridge portion 53 connecting the first connecting portion 51 and the second connecting portion 52. The bridge portion 53 extends in a horizontal direction.

The pull strap 5 is movable in a direction opposite to the mating direction M under the pulling of the external force, so as to directly or indirectly drive the locking protrusions 411 to move away from the first surface 1121 in the thickness direction T-T. Specifically, referring to FIGS. 14 and 16, in the illustrated embodiment of the present disclosure, when the pull strap 5 moves in the direction opposite to the mating direction M under the pulling of the external force, each outer abutting surface 4211*a* of the protruding portion 4211 abuts against the inner abutting surface 412*a* of the abutting portion 412, and slides on the inner abutting surface 412*a*. Under this condition, an upward force is generated to move the abutting portions 412 upwardly and compress the compression springs. At the same time, the locking protrusions 411 move downwardly to move away from the first surface 1121. This state is an unlocked state of the plug connector 100.

When the external force is removed, the return springs 43 release elastic force, so that the abutting portions 412 move downwardly. At the same time, the locking protrusions 411 move upwardly, and the locking arms 41 return to their original positions.

In the present disclosure, the two return springs 43 are provided to make the force of the locking arms 41 more even, which improves the stability of the movement of the locking arms 41.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. A plug connector, comprising:

a housing, the housing comprising a mating surface;

a built-in circuit board, the built-in circuit board being partially located in the housing, the built-in circuit board comprising a tongue plate and a plurality of conductive pads provided on the tongue plate; and a cable, the cable being electrically connected to the built-in circuit board;

wherein the housing comprises an extension plate extending along a mating direction of the plug connector; both the tongue plate and the extension plate protrude beyond the mating surface along the mating direction; and the extension plate further protrudes beyond the tongue plate along the mating direction; and wherein each lateral side of the plug connector defines a slot extending through the mating surface;

wherein the housing comprises a first housing and a second housing, the first housing comprises a first base and a first extension portion extending from the first base, the second housing comprises a second base and a second extension portion extending from the second base, the first base corresponds to the second base in a thickness direction of the plug connector, the first extension portion corresponds to the second extension portion in the thickness direction, and the extension plate extends from the first extension portion along the mating direction; and wherein the plug connector further comprises a pair of locking protrusions located on opposite sides of the plug connector, each locking protrusion protrudes beyond the housing along the thickness direction of the plug connector; wherein each slot extends backwardly to be adjacent to a corresponding locking protrusion.

2. The plug connector according to claim 1, wherein a length of the extension plate protruding beyond the mating surface along the mating direction is L1, and a length of the tongue plate protruding beyond the mating surface along the mating direction is L2, where $L1 \geq 2*L2$.

3. The plug connector according to claim 1, wherein each slot is provided on the first extension portion; or each slot is provided on the second extension portion; or each slot is formed between the first extension portion and the second extension portion in the thickness direction.

4. The plug connector according to claim 1, wherein the first extension portion comprises two convex portions located on opposite sides of the first extension portion, each convex portion protrudes along the thickness direction of the plug connector and extends along the mating direction, and each slot is provided on a corresponding convex portion.

5. The plug connector according to claim 4, wherein each convex portion comprises a first front end surface, the second extension portion comprises a second front end surface, the first front end surface and the second front end surface are aligned with each other in the thickness direction so as to jointly form the mating surface.

6. The plug connector according to claim 4, wherein a front side of the convex portion comprises a locking portion, a front side of the second extension portion comprises a locking slot, the locking portion is fixed in the locking slot so as to prevent the first housing and the second housing from being separated from each other in the thickness direction.

7. The plug connector according to claim 1, wherein the first extension portion comprises a first surface and two openings extending through the first surface along the thickness direction, the two openings are located on opposite sides of the first extension portion, and the locking protrusions are located in the openings, respectively and protrude beyond the first surface along the thickness direction.

8. The plug connector according to claim 7, wherein the second extension portion comprises a second surface, the first surface and the second surface are disposed opposite to each other along the thickness direction, and a distance between the slot and the first surface in the thickness direction is smaller than a distance between the slot and the second surface.

9. The plug connector according to claim 7, wherein a rear side of the second extension portion comprises two limiting protrusions, each limiting protrusion protrudes into a corresponding opening along the thickness direction, each limiting protrusion is located outside the corresponding locking protrusion along a width direction of the plug connector so as to limit the corresponding locking protrusion.

10. The plug connector according to claim 1, further comprising a bolt to assemble and fix the first base and the second base, the built-in circuit board being at least partially clamped between the first extension portion and the second extension portion, the second extension portion comprising two positioning posts, opposite sides of the built-in circuit board defining positioning notches matched with the positioning posts, and the plurality of conductive pads being located on opposite surfaces of the tongue plate.

11. The plug connector according to claim 1, further comprising a pull strap, the pull strap being movable in a direction opposite to the mating direction under pulling of an external force so as to directly or indirectly drive the locking protrusion to move away from the first surface along the thickness direction.

12. The plug connector according to claim 11, further comprising two locking arms installed on opposite sides of the second housing and a driving member mated with the locking arms, each locking protrusion being located at a front end of the locking arm, and the driving member being connected with the pull strap; wherein each locking arm further comprises an abutting portion located at a rear end of the locking arm, and a pivot portion located between the locking protrusion and the abutting portion; and wherein each locking arm is rotatable around a corresponding pivot portion under the action of the external force.

13. The plug connector according to claim 12, further comprising two return springs, each return spring being mated with a corresponding locking arm and adapted to return the corresponding locking arm to an original position after the external force is removed.

14. The plug connector according to claim 12, wherein the pivot portion comprises a pivot hole, the plug connector comprises a pivot shaft received in the pivot hole, each locking arm comprises a first recess located between the abutting portion and the pivot hole, and an inner abutting surface exposed in the first recess; wherein the driving member comprises two driving arms located on opposite sides of the driving member, each driving arm comprises a protruding portion received in the first recess and a second recess adapted to receive the abutting portion, and the protruding portion comprises an outer abutting surface adapted to abut against the inner abutting surface.

15. The plug connector according to claim 14, wherein the inner abutting surface is an inclined surface, and the outer abutting surface is a curved surface; wherein each driving arm comprises a base portion and a fixing portion protruding from the base portion, the base portion comprises a protrusion, the first housing comprises two limiting slots, the protrusion is movable in a corresponding limiting slot under the action of the external force, and the fixing portion is insert-molded in the pull strap; and wherein the driving member comprises a connecting rod connecting the base portions of the two driving arms.

16. A plug connector, comprising:
- a housing comprising a mating surface;
- a built-in circuit board partially located in the housing, the built-in circuit board comprising a tongue plate and a plurality of conductive pads provided on the tongue plate; and
- a cable electrically connected to the built-in circuit board;
- wherein the housing comprises an extension plate extending along a mating direction of the plug connector; both the tongue plate and the extension plate protrude beyond the mating surface along the mating direction; and the extension plate further protrudes beyond the tongue plate along the mating direction;
- wherein a length of the extension plate protruding beyond the mating surface along the mating direction is L1, and a length of the tongue plate protruding beyond the mating surface along the mating direction is L2, where $L1 \geq 2*L2$;
- wherein on one side of the tongue plate along a thickness direction perpendicular to the mating direction, only one extension plate is provided protruding beyond the mating surface along the mating direction; and on another side of the tongue plate opposite to the extension plate along the thickness direction, no feature is provided protruding beyond the mating surface along the mating direction;
- wherein each lateral side of the plug connector defines a slot extending through the mating surface;
- wherein the housing comprises a first housing and a second housing, the first housing comprises a first base and a first extension portion extending from the first base, the second housing comprises a second base and a second extension portion extending from the second base, the first base corresponds to the second base in the thickness direction of the plug connector, the first extension portion corresponds to the second extension portion in the thickness direction, and the extension plate extends from the first extension portion along the mating direction; and
- wherein the plug connector further comprises a pair of locking protrusions located on opposite sides of the plug connector, each locking protrusion protrudes beyond the housing along the thickness direction of the plug connector; wherein each slot extends backwardly to be adjacent to a corresponding locking protrusion.

17. A plug connector, comprising:
- a housing comprising a mating surface;
- a built-in circuit board partially located in the housing, the built-in circuit board comprising a tongue plate and a plurality of conductive pads provided on the tongue plate; and
- a cable electrically connected to the built-in circuit board;
- wherein the housing comprises an extension plate extending along a mating direction of the plug connector; both the tongue plate and the extension plate protrude beyond the mating surface along the mating direction; and the extension plate further protrudes beyond the tongue plate along the mating direction;

wherein a length of the extension plate protruding beyond the mating surface along the mating direction is L1, a length of the tongue plate protruding beyond the mating surface along the mating direction is L2, a value range of L1 is 12.0 mm to 13.0 mm, and a value range of L2 is 3.8 mm to 3.9 mm; and wherein a width of the extension plate along a width direction perpendicular to the mating direction falls within a range of 20.0 mm to 21.0 mm, and a width of the tongue plate along the width direction falls within a range of 18.0 mm to 19.0 mm;

wherein on one side of the tongue plate along a thickness direction perpendicular to the mating direction, only one extension plate is provided protruding beyond the mating surface along the mating direction; and on another side of the tongue plate opposite to the extension plate along the thickness direction, no feature is provided protruding beyond the mating surface along the mating direction;

wherein each lateral side of the plug connector defines a slot extending through the mating surface;

wherein the housing comprises a first housing and a second housing, the first housing comprises a first base and a first extension portion extending from the first base, the second housing comprises a second base and a second extension portion extending from the second base, the first base corresponds to the second base in the thickness direction of the plug connector, the first extension portion corresponds to the second extension portion in the thickness direction, and the extension plate extends from the first extension portion along the mating direction; and wherein the plug connector further comprises a pair of locking protrusions located on opposite sides of the plug connector, each locking protrusion protrudes beyond the housing along the thickness direction of the plug connector; wherein each slot extends backwardly to be adjacent to a corresponding locking protrusion.

* * * * *